United States Patent
Dekel et al.

(10) Patent No.: US 10,096,839 B2
(45) Date of Patent: Oct. 9, 2018

(54) PREPARATION OF ADVANCED CCMS FOR AMFCS BY AMINATION AND CROSS-LINKING OF THE PRECURSOR FORM OF THE IONOMER

(71) Applicant: Elbit Systems Land and C4I Ltd., Netanya (IL)

(72) Inventors: Dario Dekel, Zichron Yaakov (IL); Shimshon Gottesfeld, Niskayuna, NY (US)

(73) Assignee: POCELL TECH LTD., Caesarea (IL)

( * ) Notice: Subject to any disclaimer, the term of this patent is extended or adjusted under 35 U.S.C. 154(b) by 171 days.

(21) Appl. No.: 14/204,057

(22) Filed: Mar. 11, 2014

(65) Prior Publication Data

US 2014/0272663 A1    Sep. 18, 2014
US 2016/0172686 A9    Jun. 16, 2016

Related U.S. Application Data

(63) Continuation-in-part of application No. 13/912,402, filed on Jun. 7, 2013, which is a continuation-in-part of application No. 13/154,056, filed on Jun. 6, 2011.

(60) Provisional application No. 61/778,921, filed on Mar. 13, 2013.

(51) Int. Cl.
| | |
|---|---|
| *H01M 8/10* | (2016.01) |
| *H01M 4/88* | (2006.01) |
| *H01M 8/1004* | (2016.01) |
| *H01M 8/1072* | (2016.01) |
| *H01M 8/04492* | (2016.01) |

(52) U.S. Cl.
CPC ......... *H01M 4/8878* (2013.01); *H01M 8/045* (2013.01); *H01M 8/1004* (2013.01); *H01M 8/1072* (2013.01); Y02P 70/56 (2015.11)

(58) Field of Classification Search
CPC .... H01M 8/1004; H01M 8/1072; H01M 8/10; H01M 4/8878; H01M 8/045
See application file for complete search history.

(56) References Cited

U.S. PATENT DOCUMENTS

| | | | |
|---|---|---|---|
| 2005/0019638 A1* | 1/2005 | Ravikiran | C08G 61/06 526/308 |
| 2009/0305110 A1* | 12/2009 | Matsuoka et al. | 429/33 |
| 2010/0021777 A1* | 1/2010 | Gottesfeld | H01M 8/0289 429/429 |

(Continued)

FOREIGN PATENT DOCUMENTS

JP    2009 158128    7/2009

OTHER PUBLICATIONS

Yuan-Cheng Cao et al.: "Preperation of alkaline anion exchange polymer membrane from methylated melamaine grafted poly (vinylbenzyl chloride) and its fuel cell performance"; Journal of Materials Chemistry, vol. 21, No. 34, Jan. 1, 2011, pp. 12910-12916, GB.

(Continued)

*Primary Examiner* — Jimmy Vo
(74) *Attorney, Agent, or Firm* — Pearl Cohen Zedek Latzer Baratz LLP

(57) ABSTRACT

In an AMFC, in the formation of a CCM, the anode catalyst layer is selectively cross-linked while the cathode catalyst layer is not cross-linked. This has been found to provide structural stabilization of the CCM without loss of initial power value for a CCM without cross-linking.

7 Claims, 4 Drawing Sheets

(56) References Cited

U.S. PATENT DOCUMENTS

2010/0081028 A1* 4/2010 An .................... H01M 4/8892
                                                    429/480
2011/0300466 A1* 12/2011 Dekel ......................... 429/465

OTHER PUBLICATIONS

Supplementary European Search Report of EP Application No. EP14778433, dated Nov. 10, 2016.

\* cited by examiner

PREPARATION OF ADVANCED CCMS FOR AMFCS BY AMINATION AND CROSS-LINKING OF THE PRECURSOR FORM OF THE IONOMER

RELATED APPLICATIONS

This application claims priority to U.S. provisional application Ser. No. 61/778,921, filed Mar. 13, 2013, and also claims priority to U.S. application Ser. No. 13/912,402, filed Jun. 7, 2013, which is a continuation-in-part application of U.S. application Ser. No. 13/154,056, filed Jun. 6, 2011, all of which are incorporated by reference herein in their entirety.

FIELD OF THE INVENTION

This invention relates to fuel cells and in particular alkaline membrane fuel cells and apparatus and methods of stabilizing the CCM structure during fuel cell operation.

BACKGROUND

The technology of alkaline membrane fuel cells (AMFCs) has been developed to date with OH-ion conducting polymers ("ionomers") with a poly{hydrocarbon} backbone. Such ionomers require significant water uptake to achieve sufficient ionic conductivity. The structure and specification of an AMFC is illustrated in, for example, US 2010/0021777, entitled "Alkaline Membrane Fuel Cells and Apparatus and methods for Supplying Water Thereto", the entire contents of which are herein incorporated by reference As the level of water uptake increases—likely over 50% by weight—the ionomer typically loses mechanical integrity, resulting in morphological changes and, in some cases, overall disintegration which causes strong loss of cell performance. The likelihood of such mode of failure is particularly high on the anode side of the AMFC, where water is generated during cell operation, according to:
Anode process: 2H2+4OH—=4H2O+4e
whereas the AMFC cathode runs on a water consuming process:
Cathode process: O2+2H2O+4e=4OH—
and is therefore much less likely to face a structural challenge by buildup of excess liquid water.

To help stabilize the cell structure, cross-linking has been suggested by one of the present inventors in a prior application as means for chemical bonding across the electrode/membrane interface. That application is U.S. Pub. No. US 2011/0300466 entitled "Chemical Bonding for Catalyst/Membrane Surface Adherence in Membrane Electrolyte Fuel cells", the entire contents of which are herein incorporated by reference.

The above application suggests that chemical bonding of a catalyst layer to a surface of an OH-ion conducting membrane or membranes is accomplished by cross-linking of polymer components across an interface between the catalyst layer and the membrane. According to the above application, both the anode side and the cathode sides of the catalyst layer-covered polymeric membrane (CM) are bonded by cross-linking with the polymeric components of the catalyst layer, either at the interface alone or with the cross-linking extending well into the catalyst layer. The methodology for cross-linking is disclosed in Paragraphs [0010] through [0016] of the above publication.

SUMMARY OF THE INVENTION

We describe in this application a comprehensive preparation of a catalyst layer—covered membrane (CCM) for an AMFC with the option to cross-link the ionomer in the catalyst layer on both sides, or only on one side of the CCM. The preparation starts from the CCM all in precursor form, followed by amination including use of diamines for cross-linking and next followed by immersion in a base to generate the active form of the CCM. We have found that selective cross-linking of the anode catalyst layer, while leaving the ionomer in the cathode catalyst layer not cross-linked, provides the benefit of structural stabilization of the CCM during cell operation while achieving initial power output at least as high as that demonstrated for the CCM without cross-linking. In an alternative approach developed, the cross-linked anode is prepared separately as a gas diffusion electrode (GDE) which is compressed in the cell onto one side of an OH— conducting membrane, pre-covered by a cathode catalyst layer on its other side.

In one embodiment, an alkaline membrane fuel cell (AMFC) includes an anode electrode, a membrane electrolyte which I so configured to conduct hydroxyl (OH—) anion, and the membrane has an interface which is in physical contact with the anode electrode on a first surface of the membrane. The AMFC further includes a cathode electrode which is in physical contact with the opposite surface of the membrane; both the electrodes include a catalyst layer and a ionomer component of the catalyst layer on the anode electrode is cross-linked to achieve structural stabilization with the loss of cell power.

In another aspect, the AMFC may be operated without a supply of water from an external source.

In another aspect, the cross-linking of the anode side takes place by preparation of a membrane catalyzed on one side with the polymer in both membrane and electrode in precursor form and the membrane and the single catalyst layer undergo a two-step conversion process to fuel cell active, ionomer form (OH— form), using amination and cross-linking agents in the first step of the process, and where the cathode catalyst layer is applied last on the second side of the membrane in fuel cell active, ionomer form without crosslinking.

In yet another aspect, the cross-linking of the anode ionomer takes place by preparation of an anode gas-diffusion electrode (GDE) with the anode catalyst layer applied to a gas-diffusion layer (GDL) in a process which involves cross-linking of the ionomer in the anode catalyst layer and the GDE so formed as compressed during cell building onto one side of a membrane in ionic form, and where the membrane was pre-catalyzed on its other side by a cathode catalyst layer and the cell completed by a second GDL adjacent the outer side of the cathode catalyst layer.

In a further aspect, a process is disclosed for chemical cross-linking of an ionomer applied selectively to the anode side of a CCM in an AMFC wherein the cathode catalyst layer is retained in non-cross-linked form.

In another aspect, in the AMFC above described, the cross-linking agent may be a diamine, or a mixture of diamines, which are applied during the step of amination of the precursor, and where the diamines may serve, in mixture with momoamine or by themselves to achieve optimized combination of structural stabilization and ionic and water transport.

In yet another aspect, the precursor may be selected based upon maximized Ionic Equivalent Capacity (IEC). The polymeric component in the catalyst layer may be a mixture of precursor form and active, ionic form.

I another aspect, the amination and cross-linking are applied to the precursor form in a non-aqueous solvent, such as, by way of example only, toluene.

DETAILED DESCRIPTION

Figure 1:
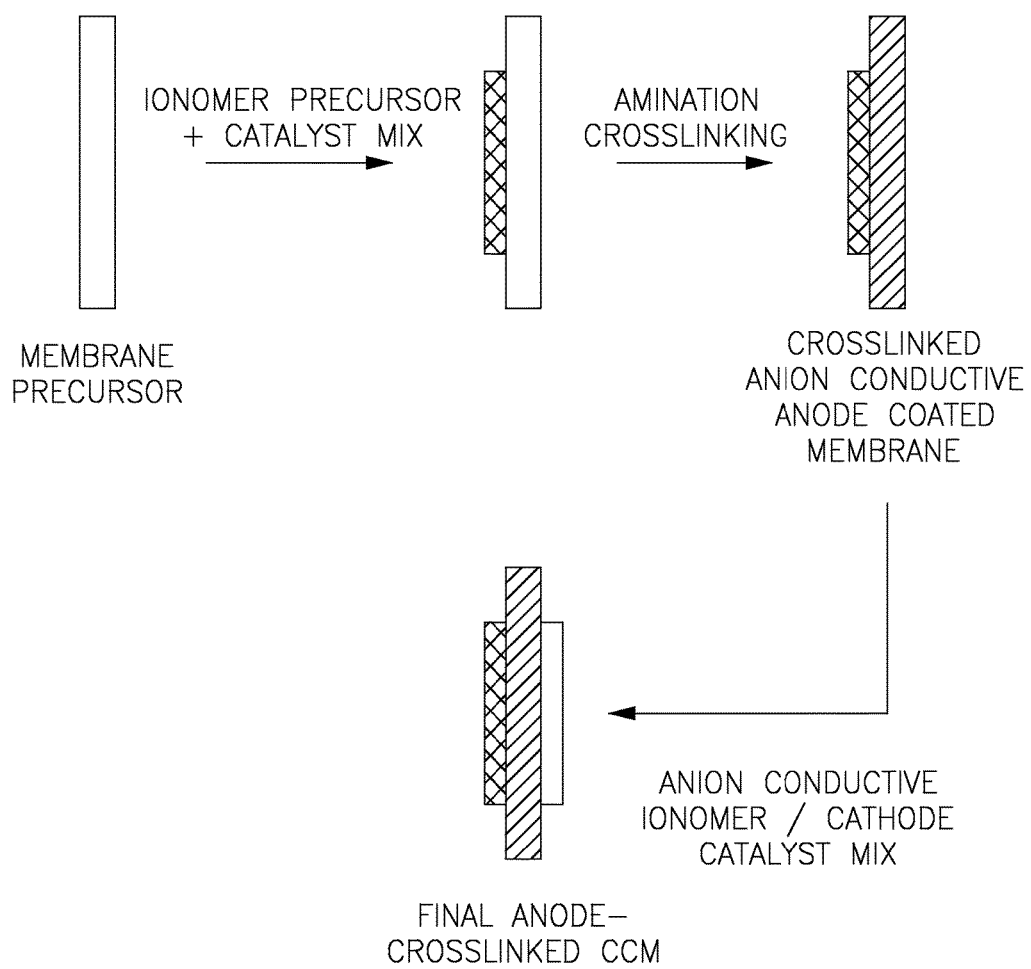
FIG. 1 illustrates a first set of steps in the present invention of a method of preparation of an anode cross-linked CCM for an AMFC.

FIG. 1 describes schematically the preparation of a catalyst covered membrane (CCM) for an alkaline membrane fuel cell (AMFC), in which the ionomer in the anode catalyst layer is cross-linked while the ionomer in the cathode catalyst is left in non-cross-linked form. The steps described are: (i) preparation of a single-sided catalyzed membrane where the anode catalyst layer and the membrane are joined while in precursor form, (ii) the precursor in both the anode and membrane is converted by amination to active ionomer form, introducing also, in the same step, cross-linking of the ionomer in the anode and in the membrane, typically by use of diamines*, (iii) hydroxylation of the ionomer and (iv) attaching the cathode catalyst layer in ionomer form, to the other side of the membrane to complete the half cross-linked CCM, designated by us as "½XCCM".

*The chemical processes involved in conversion to active form by amination and cross-linking by use of diamines, are described by chemical equations given in the above-mentioned U.S. Pub. No.: US 2011/0300466.

Figure 2:
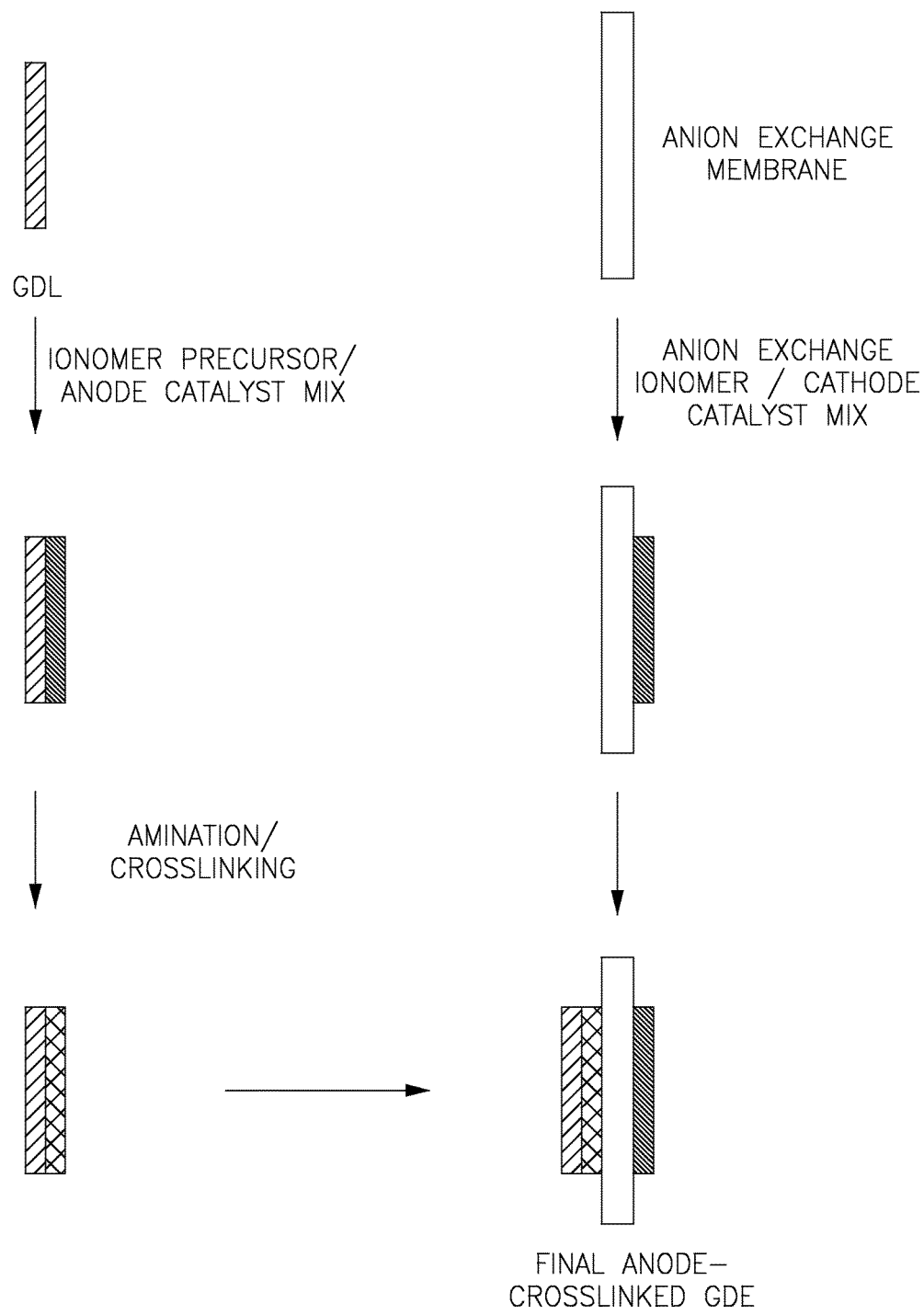
FIG. 2 illustrates a second set of steps in the present invention of a method of preparation of an anode cross-linked GDE.

FIG. 2 describes schematically an alternative preparation of a catalyst covered membrane (CCM) for an alkaline membrane fuel cell (AMFC), in which the ionomer in the anode catalyst layer is cross-linked while the ionomer in the cathode catalyst is left in non-cross-linked form. The steps described are (i) preparation of a gas-diffusion electrode where the anode catalyst layer is deposited on gas-diffusion layer while in precursor form, (ii) the precursor in both the anode is converted by amination to active ionomer form introducing also, in the same step, cross-linking of the ionomer in the anode, typically by use of diamines*, (iii) hydroxylation of the ionomer and (iv) attaching the GDE to the OH— ion conducting membrane with the cathode catalyst layer in ionomer form pre-attached on the other side to complete the half cross-linked CCM, designated by us as "½XCCM".

*The chemical processes involved in conversion to active form by amination and cross-linking by use of diamines, are described by chemical equations given in the above-mentioned U.S. Pub. No.: US 2011/0300466.

Figure 3:
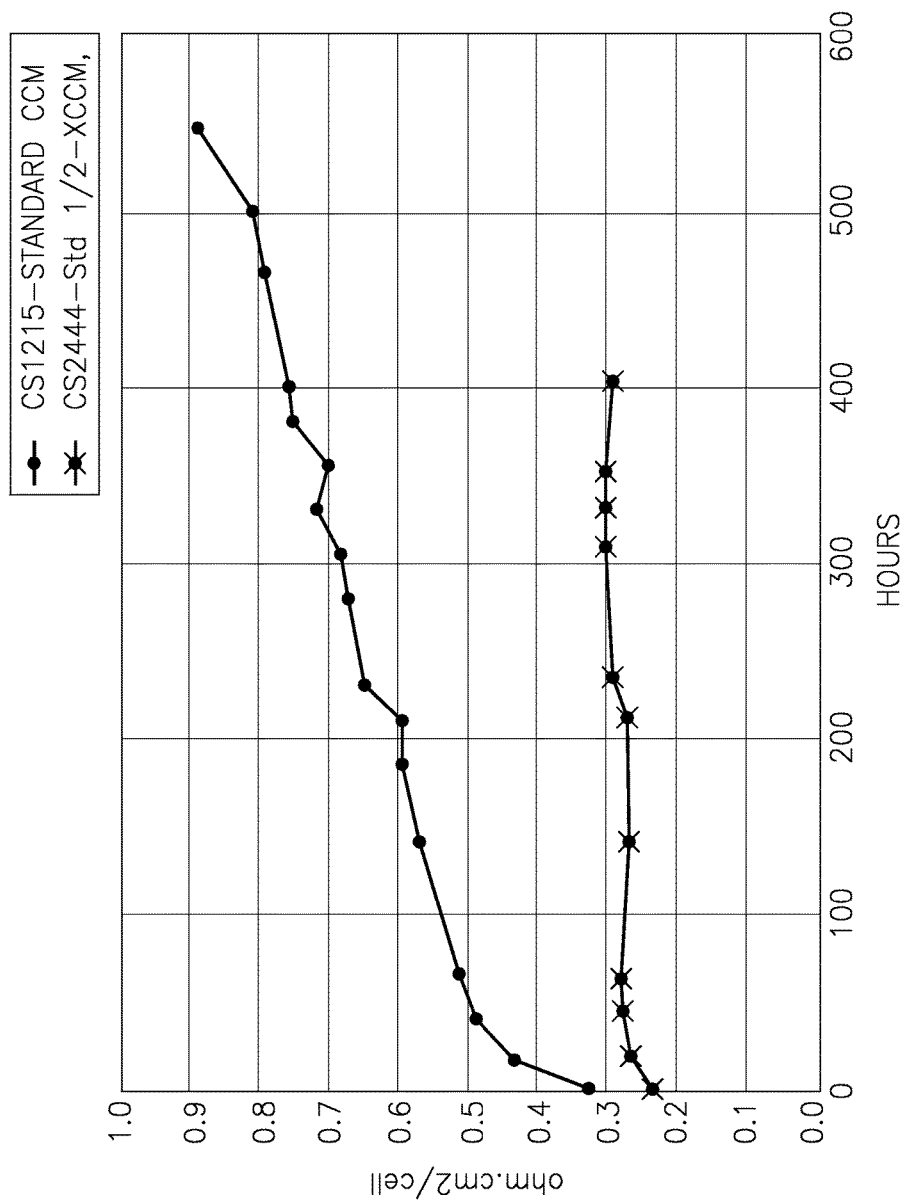
FIG. 3 illustrates in graphical form the effects of the present invention in maintaining AMFC resistance (HFR) near its initial value over a period of time.

FIG. 3 illustrates the beneficial effect of selective cross-linking of the ionomer on the anode side in maintaining the AMFC resistance (HFR) near its initial value after hundreds of hours of operation. The top curve shows the significant rise of the AMFC resistance over time when no cross-linking is used and the bottom curve shows the much smaller rise of HFR with operation time following cross-linking on the anode side alone.

Figure 4:
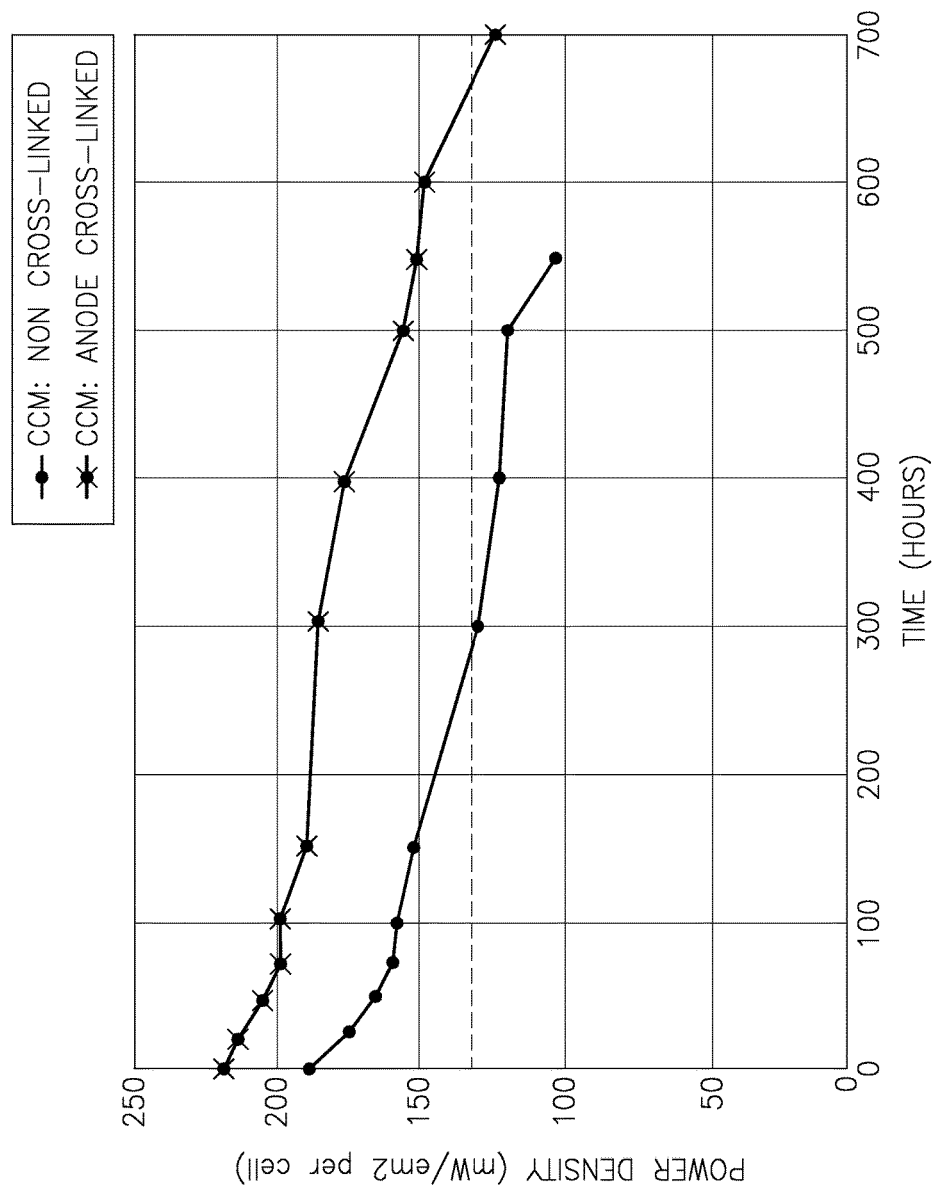
FIG. 4 illustrates in graphical form the effects of the present invention on power output over long periods of operation.

FIG. 4 illustrates the beneficial effect of selective cross-linking on the anode side of the CCM in an AMFC on the power output over operation times of the order of hundreds of hours. Anode side cross-linking is seen to increase the initial power and lower the rate of power loss with time, as compared with the case of no cross-linking.

Above, we have demonstrated that the modes of preparation of membrane/electrode assemblies for AMFCs involving cross-linking on the anode side, according to either of the techniques shown in FIG. 1 and FIG. 2, have achieved significant stabilization of the CCM vs. CCMs prepared with no cross-linking of the ionomer in the catalyst layers. The evidence for a more robust structure was the stabilization of the ohmic (HFR) resistance of CCMs with cross-linked ionomer on the anode side over hundreds of hours of cell operation. This was in significant contrast to continuous rise of the HFR over similar length of operation times, observed consistently when no cross-linking was introduced, as can be seen in FIG. 3.

Further, the inventors herein observed that stabilization of the catalyst layer structures and any formation of interfacial bonds by cross-linking on the cathode side of the CCM, did not contribute significantly further to stabilization of the cell HFR and, consequently, did not provide significant further stabilization of the cell power over operation time. It was concluded that ionomer cross-linking may be of critical importance on the anode side of the cell because this is the site of water formation in the AMFC and, consequently, the morphology of the anode catalyst layer in the AMFC is vulnerable to over-swelling. In contrast, on the AMFC cathode such over-swelling is highly unlikely, as the AMFC cathode process involves water consumption, rather than water generation.

Targeting both ionomer phase stabilization and catalyst layer/membrane interfacial bonding, cross-linking needs to be achieved across the anode catalyst layer and into the membrane. For that purpose, a CCM was made starting with an anode catalyst layer applied on one side of a membrane, where the polymer in both the membrane and the anode catalyst layer is in precursor (non-ionic) form. A mixture of monoamines and diamines, or diamines alone, then converts the polymer to ionic form, while cross-linking it at the same time. Following application next of a non-cross-linked cathode catalyst layer on the other side of the membrane, a "half cross-linked CCM" was formed, with the ionomer on the anode side only being cross-linked, while leaving the ionomer in the cathode catalyst layer not cross-linked and, thereby, facilitating unhindered water transport to and within the cathode. This preparation of a "half-cross-linked" CCM was described above and illustrated schematically in FIG. 1. The test results for such "half-cross-linked" CCMs, confirmed that it was indeed specifically the anode catalyst layer that required stabilization by cross-linking, as stabilization of cell resistance (HFR) over long operation times was well achieved by such selective cross-linking confined to the anode side only, as shown in FIG. 3. Thanks to stabilization of the HFR in cells with the "half-cross-linked" CCM, the power density of such cells fell to lesser degree with cell operation time, as illustrated in FIG. 4.

In looking for the best type of ionomer precursor for use on the anode side of an AMFC, in which such precursor is to be functionalized and cross-linked to achieve the final form of the CCM, the inventors have noted that some restrictions of water transport in the AMFC anode are typically observed following cross-linking. It was discovered that the way to achieve anode stabilization by cross-linking at negligible penalty of water and ion transport in the cross-linked anode, is to use a precursor of the highest possible ionic site concentration, i.e., of highest IEC (Ionic Equivalent Capacity). Specifically, ionomers of IEC values which would normally exhibit instability following long term immersion in warm water (e.g., IEC close to 4 meq/gr), are rendered sufficient stability by optimized level of crosslinking, while maintaining, following such cross-linking, sufficient water and ion mobility thanks to the high concentration of ionic sites. The selection of a very high-IEC precursor to achieve good structural stabilization without loss of water and ionic transport rates, is, therefore, an important part of our discovery.

In addition to the choice of most suitable ionomer precursor for the combined process of functionalization and cross-linking, other details of the formulation and the conditions of combined amination/cross-linking have been developed as part of this discovery. One option discovered is to use only di-amine (no mono-amine) to achieve both functionalization and cross linking. Introduction of this last approach has special value in enabling to work with amines of low volatility (diamines) without the need to use highly volatile monoamines which are notorious for their bad odor. A single diamine or a mixture of two diamines were found to work best in various cases. The choice of solvent is another important factor and use of various non-aqueous solvents in the functionalization and cross-linking process has some special merit in swelling the polymer during the process. It has been found, for instance, that while replacing trimethylamine (TMA) with the diamine DABCO for amination, the best solvent to achieve crosslinking is toluene, and not water as regularly used. Using toluene as solvent allows better solvation of the polymer achieving then optimized crosslinking in the polymer backbone. Toluene also was found to be the best solvent for amination and cross-linking while using a mixture of ordinary diamine (like hexanetetramethyldiamine) and DABCO for both amination and crosslinking steps.

In yet another formula developed to maximize transport rates following cross-linking, a high IEC ionomer was mixed with a high IEC ionomer-precursor before functionalization of the precursor induced together with cross-linking, by use of some mixture and concentrations of mono- and di-amines. In this way, a fraction of the ionic material—the high IEC ionomer—assists in achieving higher water transport rates, as, unlike the precursor, it will not be cross-linked while being functionalized. At the same time, the non-cross-linked, water accommodating, high IEC ionomer, is given protection from dissolution by entrapment inside a network of the cross-linked ionomer generated from the ionomer precursor.

All the above described features of the ½ XCCM preparation routine developed, that were aimed to sustain highest water and ion transport rate following cross-linking were successful in maintaining the important capability to operate the AMFC stacks without any supply of water from an external source. This is considered a key achievement, as the trade-off between stabilization by cross-linking and loss of transport rate typically associated with it is not easy to resolve in principle.

An alternative approach to achieve an AMFC with a cross-linked anode is to prepare the cell with a gas diffusion anode electrode (GDE) which is cross-linked and attached to a membrane with the other side of the membrane pre-coated by a cathode catalyst layer (see FIG. 2). Such a GDE anode is prepared by application of the anode catalyst layer onto a gas diffusion layer (GDL) using spraying or printing, followed by treatment with a cross-linking agent, for example di-amines, to achieve anode cross-linking. The membrane with a cathode catalyst pre-applied to one side, is prepared without cross-linking, and the cross-linked anode GDE is attached to the free side of the membrane by mechanical compression to form the full cell (see FIG. 2). A possible advantage of the separate preparation of a cross-linked, anode GDE, is in facilitating water transport from such anode into the membrane, as the cross-linking process is now confined to the bulk of the anode catalyst layer with the "seam" between the anode catalyst layer and the membrane left not cross-linked. Thereby, water crossing is facilitated from the anode into the membrane, towards the water consuming cathode.

What is disclosed here is believed to be an original approach to structural stabilization of AMFC catalyst layers and CCMs, based on amination and cross-linking of a CCM in precursor form and, within this technical approach, CCMs for AMFCs where cross-linking is confined to the anode side, thereby allowing significant stabilization of the vulnerable anode catalyst layer while keeping the water transport unhindered in the cathode. The latter approach allows to achieve, simultaneously, significant stabilization of the cell resistance vs. non-cross-linked CCMs and the maintenance (if not increase) of the initial power level seen for non-cross-linked (and less stable) CCMs.

What is claimed is:

1. An alkaline membrane fuel cell comprising:
   an anode electrode;
   a membrane electrolyte configured to conduct hydroxyl (OH—) anion constructed from a poly-hydrocarbon or poly-perfluorocarbon backbone and OH— anion carrying units, the membrane having an interface in physical contact with the anode electrode on a first surface of the membrane;
   a cathode electrode in physical contact with a second opposite surface of the membrane;
   the anode electrode and the cathode electrode each having a catalyst layer;
   wherein an ionomer component of the catalyst layer on the anode electrode is cross-linked to achieve structural stabilization without loss of cell power and wherein the cathode electrode is retained in a non-cross-linked form, and
   wherein preparation of the cross-linked ionomer component of the catalyst layer is completed by amination and cross-linking using a cross-linking agent, the cross-linking agent is a diamine, or mixture of diamines.

2. The fuel cell in claim 1, wherein the fuel cell not including an external supply of water.

3. The fuel cell in claim 1 wherein the cross-linked anode side of the fuel cell includes the membrane catalyzed on one side with a polymer in both membrane and electrode in precursor form and wherein the precursor is an ionomer possessing high Ionic Equivalent Capacity (IEC).

4. The fuel cell in claim 2 wherein cross-linking of the anode ionomer takes place by preparation of an anode gas-diffusion electrode (GDE) with the anode catalyst layer applied to a gas-diffusion layer (GDL) in a process which involves cross-linking of the ionomer in the anode catalyst layer and the GDE so formed is compressed during cell building onto one side of a membrane in ionic form, wherein the membrane was pre-catalyzed on its other side by a cathode catalyst layer and the cell completed by a second GDL adjacent the outer side of the cathode catalyst layer.

5. The fuel cell of claim 1 wherein a polymeric component in the catalyst layer is a mixture of precursor form and active, ionic form.

6. The fuel cell of claim 3, wherein the membrane and the anode catalyst layer having undergone a two-step conversion to fuel cell active, ionomer form (OH— form), through use of animation and cross-linking agents.

7. An alkaline membrane fuel cell comprising;
   an anode electrode;

a membrane electrolyte configured to conduct hydroxyl (OH—) anion constructed from a poly-hydrocarbon or poly-perfluorocarbon backbone and OH— anion carrying units, the membrane having an interface in physical contact with the anode electrode on a first surface, of the membrane;

a cathode electrode in physical contact with a second opposite surface of the membrane;

the anode electrode and the cathode electrode each having a catalyst layer;

wherein an ionomer component of the catalyst layer on the anode electrode is cross-linked to achieve structural stabilization without loss of cell power;

wherein the cathode electrode is retained in a non-cross-linked form;

wherein the anode side of the fuel cell includes a polymer in both membrane and electrode in precursor form;

wherein amination and cross-linking have been applied to the precursor form using a non-aqueous solvent toluene; and wherein the cross-linking is performed by using a cross-linking agent, the cross-linking agent is a diamine, or mixture of diamines, where the diamines serve in mixture with monoamine, or by themselves.

* * * * *